US008392729B2

(12) United States Patent
Egan et al.

(10) Patent No.: US 8,392,729 B2
(45) Date of Patent: *Mar. 5, 2013

(54) OVERSUBSCRIBING BRANCH CIRCUITS WHILE LOWERING POWER DISTRIBUTION COSTS

(75) Inventors: Patrick K. Egan, Rochester, MN (US); Wesley M. Felter, Austin, TX (US); Karthick Rajamani, Austin, TX (US); Juan C. Rubio, Austin, TX (US); Malcolm S. Ware, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/451,181

(22) Filed: Apr. 19, 2012

(65) Prior Publication Data

US 2012/0233479 A1 Sep. 13, 2012

Related U.S. Application Data

(63) Continuation of application No. 12/686,008, filed on Jan. 12, 2010.

(51) Int. Cl.
G06F 1/26 (2006.01)
(52) U.S. Cl. ....................... 713/300; 713/340
(58) Field of Classification Search .................. 713/300, 713/310, 340; 714/14, 22
See application file for complete search history.

(56) References Cited

U.S. PATENT DOCUMENTS

| 6,330,516 | B1 | 12/2001 | Kammeter |
| 6,804,616 | B2 | 10/2004 | Bodas |
| 6,968,470 | B2 | 11/2005 | Larson et al. |
| 6,986,069 | B2 | 1/2006 | Oehler et al. |
| 7,095,324 | B2 | 8/2006 | Conwell et al. |
| 7,210,048 | B2 | 4/2007 | Bodas |
| 7,307,529 | B2 | 12/2007 | Gutnik et al. |
| 7,353,410 | B2 | 4/2008 | Desai et al. |
| 7,363,516 | B2 | 4/2008 | Bresniker et al. |
| 7,444,526 | B2 | 10/2008 | Felter et al. |
| 7,747,354 | B2 | 6/2010 | Papallo et al. |
| 7,865,272 | B2 | 1/2011 | Spitaels et al. |
| 8,132,034 | B2 | 3/2012 | Lambert et al. |
| 2006/0133175 | A1 | 6/2006 | Gutnik et al. |
| 2006/0206730 | A1 | 9/2006 | Cartes et al. |
| 2007/0010916 | A1 | 1/2007 | Rodgers et al. |
| 2008/0030078 | A1 | 2/2008 | Whitted et al. |
| 2008/0189700 | A1 | 8/2008 | Schmidt et al. |
| 2008/0320322 | A1 | 12/2008 | Green et al. |
| 2009/0125737 | A1 | 5/2009 | Brey et al. |
| 2009/0271725 | A1 | 10/2009 | Dirla |
| 2010/0235654 | A1 | 9/2010 | Malik |
| 2011/0144818 | A1 | 6/2011 | Li et al. |

OTHER PUBLICATIONS

International Search Report and Written Opinion dated May 11, 2011 in International Application No. PCT/EP2011/050070, 7 pages.
Pelley, Steven et al., "Power Routing: Dynamic Power Provisioning in the Data Center", ASPLOS'10, Version 45, No. 3, Pittsburgh PA, Mar. 13-17, 2010, pp. 231-242.
Wang, Xiaorui et al., "SHIP: Scalable Hierarchical Power Control for Large-Scale Data Centers", PACT'09 Proceedings of the 2009 18th International Conference on Parallel Architectures and Compilation Techniques, Raleigh, NC, Sep. 12-16, 2009, 10 pages.
U.S. Appl. No. 13/590,733, 1 page.

*Primary Examiner* — Paul Yanchus, III
(74) *Attorney, Agent, or Firm* — Francis Lammes; Stephen J. Walder, Jr.; Libby Z. Toub

(57) ABSTRACT

A mechanism is provided for oversubscribing branch circuits. An active energy management mechanism determines a cumulative wattage rating using power consumption information for a powered element, the power consumption information is for a primary and a redundant portion of the powered element. The active energy management mechanism determines a power reduction power cap to be used by the powered element in the event of a loss of either a primary or a redundant power source supplied to the powered element using the cumulative wattage rating, a branch circuit rating, and a circuit breaker rating for the powered element. The active energy management mechanism sends the power reduction power cap to the powered element in order that the powered element reduces power to the power reduction power cap in the event of the loss of either the primary power source or the redundant power source supplied to the powered element.

7 Claims, 8 Drawing Sheets

OVERSUBSCRIBING BRANCH CIRCUITS WHILE LOWERING POWER DISTRIBUTION COSTS

This application is a continuation of application Ser. No. 12/686,008, filed Jan. 12, 2010, status pending.

GOVERNMENT RIGHTS

This invention was made with United States Government support under Agreement No. HR0011-07-9-0002, awarded by DARPA. THE GOVERNMENT HAS CERTAIN RIGHTS IN THE INVENTION.

BACKGROUND

The present application relates generally to an improved data processing apparatus and method and more specifically to an apparatus and method for oversubscribing branch circuits in a data center while lowering power distribution costs.

The power consumption of information technology (IT) equipment depends on the configuration of the equipment and the workload the equipment processes. To stay within power consumption limits, IT manufacturers rate equipment for:
  worst conditions, such as high temperature, high altitude, or the like;
  maximum configuration, such as all processor sockets fully installed and operating, all drive bays fully installed and used, all expansion cards fully installed and operating, all DIMM slots fully installed and used, or the like; and
  extreme workloads, such as:
    DAXPY, which is a combined scalar multiplication plus vector addition operation where the scalar α and the vectors x and y are a double precision α,
    Linpack, which is a collection of Fortran subroutines that analyze and solve linear equations and linear least-squares problems, or
    "power virus", which finds input vectors that cause maximum dynamic power dissipation (maximum toggles) in circuits.

Data center and FT operators have argued for a long time that equipment seldom uses as much current/power as rated causing unnecessary power distribution cost that impedes IT growth.

SUMMARY

In one illustrative embodiment, a method, in a data processing system, is provided for oversubscribing branch circuits. The illustrative embodiment determines a cumulative wattage rating using power consumption information for a powered element. In the illustrative embodiment the power consumption information is for a primary portion and a redundant portion of the powered element. The illustrative embodiment determines a power reduction power cap to be used by the powered element in the event of a loss of either a primary power source or a redundant power source supplied to the powered element using the cumulative wattage rating, a branch circuit rating, and a circuit breaker rating for the powered element. The illustrative embodiment sends the power reduction power cap to the powered element in order that the powered element reduces power to the power reduction power cap in the event of the loss of either the primary power source or the redundant power source supplied to the powered element.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

One illustrative embodiment provides an active energy management mechanism for oversubscribing branch circuits in a data center while lowering power distribution costs. The active energy management mechanism oversubscribes branch circuits according to physical circuit breaker limits and current electrical code's nominal capacity usage model for branch circuit lines. In order to stay within the physical circuit breaker limits and current electrical code's nominal capacity usage model for branch circuit lines, when a power failure occurs in either primary or redundant power supplied to a powered element or component in a data center, the illustrative embodiments provide for each powered element to implement a reduction in power consumption such that the operational power supply is not oversubscribed and thus does not trip a circuit breaker protecting the power line.

In another illustrative embodiment, the active energy management mechanism provides for identifying pairs of powered elements that may serve as mutual backups to each other if the power supply of one of them fails or is reduced. In data centers where power failures may occur at a powered element level, rack level (group of powered elements), row level (group of racks), bay level (group of rows), or the like, each powered element may not be affected by a loss of power if another powered element loses power. By virtually connecting powered elements together through a network, when one powered element that is identified as a high priority powered element either has a reduction in power or loses primary power and is operating with a time constrained battery backup due to the loss of both primary and redundant power, then paired fully operational powered element that is network connected may be utilized to migrate information from the effected powered element to the fully operation powered element.

Figure 1:
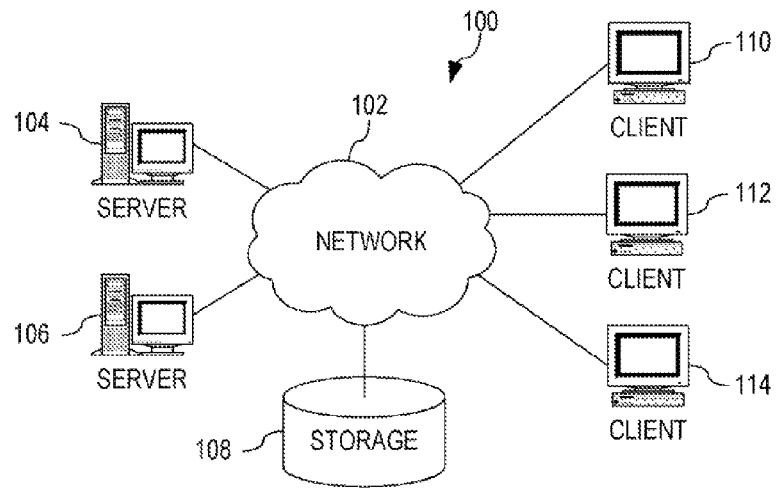
FIG. 1 depicts a pictorial representation of an example distributed data processing system in which aspects of the illustrative embodiments may be implemented.
Figure 2:
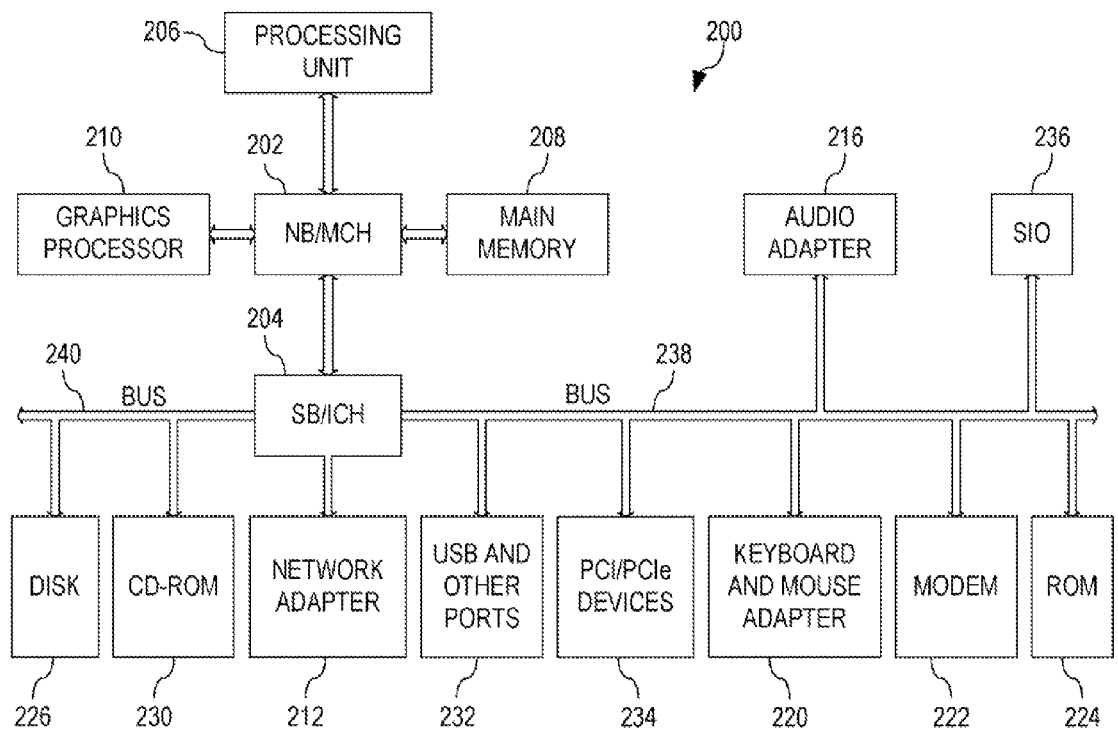
FIG. 2 shows a block diagram of an example data processing system is shown in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of an active energy management mechanism for oversubscribing branch circuits in a data center while lowering power distribution costs, this is only an example and is not intended to state or imply any limitation with regard to the features of the present invention. To the contrary, the illustrative embodiments are intended to include distributed data processing environments and embodiments in which branch circuits may be oversubscribed in a data center while lowering power distribution costs.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCUPCIe devices 234 connect to SB/ICH 204 through bus 238 and bus 240. PCUPCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft$^{oo}$ Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such us flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

The illustrative embodiments provide an active energy management mechanism that may be implemented in a data processing system. The active energy management mechanism identifies branch circuit ratings and circuit breaker ratings for each powered element in a distributed data processing system. The active energy management mechanism then actively monitors each powered element to determine an average power consumption of the powered element. Based on the average power consumption, the branch circuit ratings, and the circuit breaker ratings for the powered element, the active energy management mechanism determines a power reduction power cap for the powered element if the powered element loses power. The powered element then uses the power reduction power cap to reduce power in the event the powered element loses either the primary or redundant power supply. Additionally, if a powered element loses either the primary or redundant power supply or completely loses power and is operating on a battery backup, then the active energy management mechanism provides for determining if the powered element has a paired powered element and, if so, initializes a information migration to the paired powered element if the paired powered element is fully operational.

Figure 3:
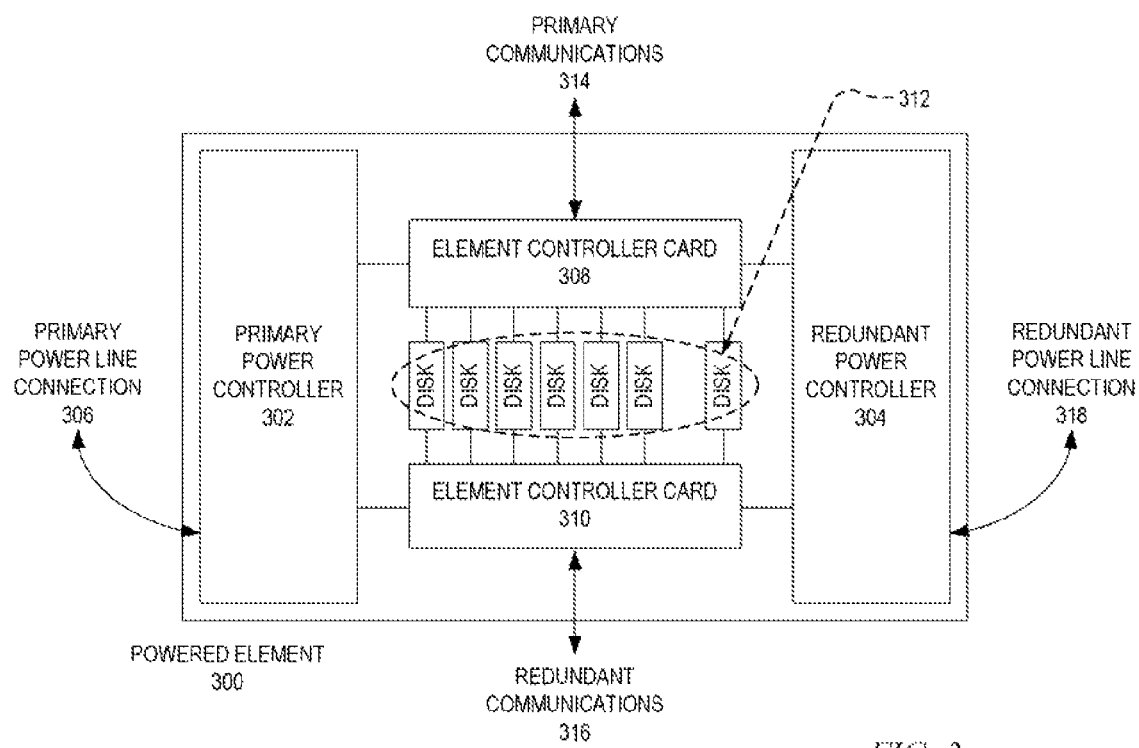
FIG. 3 depicts an exemplary powered element that receives power from a power controller in accordance with an illustrative embodiment.

FIG. 3 depicts an exemplary powered element that receives power from a power controller in accordance with an illustrative embodiment. Powered element 300 includes primary power controller 302 and redundant power controller 304. Primary power controller 302 receives power from a primary power supply of a power distribution device over primary power line connection 306. Primary power controller 302 then provides power to devices within powered element 300, such as element controller card 308 or 310, hard disk drives 312, or the like depending on which devices are within the powered element. Element control cards 308 and 310 receive normal communication data through primary communications 314 or redundant communications 316. While powered element 300 is depicted as a field replaceable unit, such as a serial attached SCSI hard disk drive (SAS HDD), storage enclosure, or the like, the illustrative embodiments are not limited to field replaceable units. That is powered element 300 may be any type of powered element such as a server, a switch, art interconnect or the like, with which active energy management mechanism may operate without departing from the spirit and scope of the invention.

Redundant power controller 304 operates in a similar manner to primary power controller 302. Redundant power supply 304 receives power from a redundant power supply of an redundant power distribution device over redundant power line connection 318. Redundant power controller 304 then provides power to devices within powered element 300, such as element controller card 308 or 310, hard disk drives 312, or the like depending on which devices are within the powered element.

During normal operation, various components within powered element 300 utilize power from primary power controller 302 and/or redundant power controller 304. Thus, redundant power controller 304 continually monitors the functions performed by primary power controller 302. Likewise, primary power controller 302 continually monitors the functions performed by redundant controller 304. In the event the primary power source fails to deliver power via primary power line connection 306, primary power controller 302 ceases to function and for a predetermined amount of time, redundant power controller 304 becomes the sole provider of power to powered element 300. If primary power controller 302 resumes delivering power, powered element 300 resumes utilizing the power from primary power controller 302 as before the loss of the primary power source.

Also during normal operation, element controller cards 308 and 310 provide power consumption information to an active energy management mechanism. The power consumption information may include statistics, such as peak power consumption, lull power consumption, average power consumption, or the like. Based on the provided power consumption information, powered element 300 receives power reduction information from the active energy management mechanism in order that power element may implement power reduction procedures in the event of losing the primary power source or the redundant power source.

Figure 4:
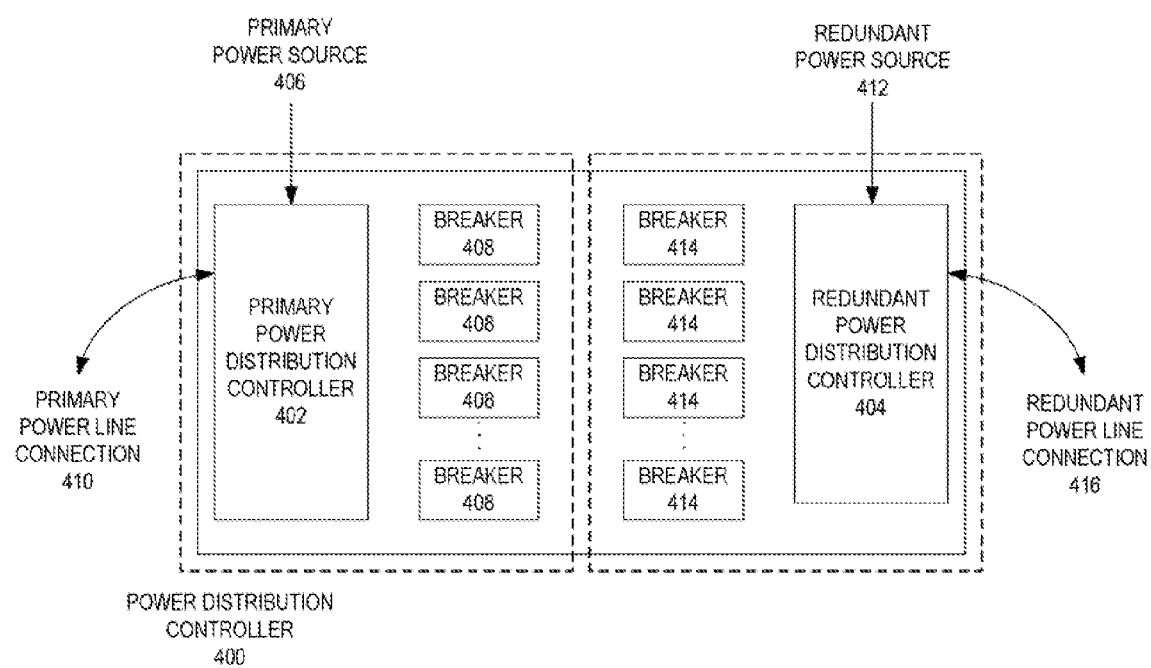
FIG. 4 depicts an exemplary power distribution device in accordance with an illustrative embodiment.

FIG. 4 depicts an exemplary power distribution device in accordance with an illustrative embodiment. Power distribution controller 400 includes primary power distribution controller 402 and redundant power distribution controller 404. Primary power distribution controller 402 receives power from primary power source 406. Primary power distribution controller 402 comprises a plurality of circuit breakers 408. Each of breakers 408 provides primary power to a powered element, such as powered element 300 of FIG. 3, via a separate primary power line connection 410. Redundant power distribution controller 404 receives power from redundant power source 412. Redundant power distribution controller 404 comprises a plurality of circuit breakers 414. Each of breakers 414 provides redundant power to a powered element, such as powered element 300 of FIG. 3, via a separate redundant power line connection 416.

If primary power source 406 fails to deliver power, primary power distribution controller 402 ceases to function and redundant power distribution controller 404 provides redundant power to powered elements through redundant power line connection 416. Likewise, if redundant power source 412 fails to deliver power, redundant power distribution controller 404 ceases to function and primary power distribution controller 402 provides primary power to powered elements through primary power line connection 410.

Figure 5:
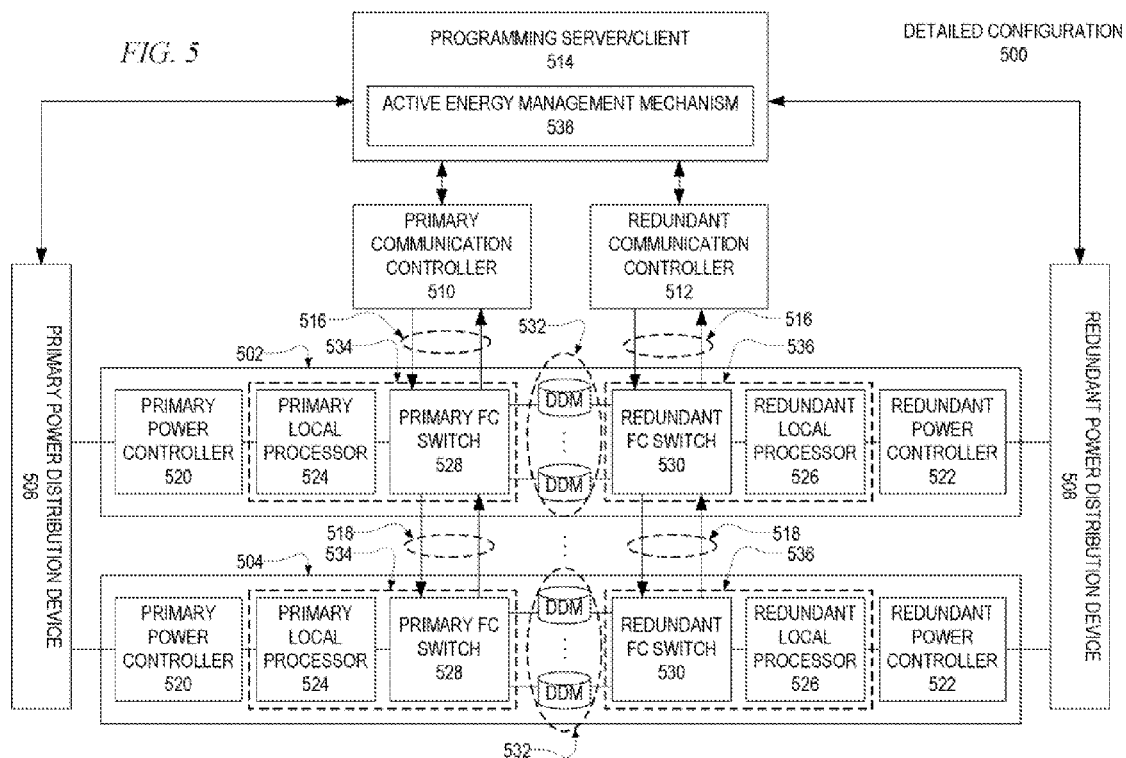
FIG. 5 illustrates an exemplary detailed configuration of powered elements in accordance with an illustrative embodiment.

FIG. 5 illustrates an exemplary detailed configuration of powered elements in accordance with an illustrative embodiment. Detailed configuration 500 depicts powered elements 502 and 504 connected to primary power distribution device 506, redundant power distribution device 508, primary communication controller 510, and redundant communication controller 512. Primary power distribution device 506, redundant power distribution device 508, primary communication controller 510, and redundant communication controller 512 may be separate devices or may be parts of a power distribution and communication controller. Powered elements 502 and 504 are powered elements similar to powered element 300 of FIG. 3, and primary power distribution device 506 and redundant power distribution device 508 are power distribution devices similar to primary power distribution controller 402 and redundant power distribution controller 404 of FIG. 4. While only powered elements 502 and 504 are depicted, any number of powered elements may be connected in a manner similar to powered elements 502 and 504. Primary communication controller 510 and redundant communication controller 512 are programming server/client 514 in order to receive and distribute communication data to powered elements 502 and 504.

Powered elements 502 and 504 may be individually connected to primary communication controller 510 and redundant communication controller 512 or, as depicted, powered element 502 may be directly connected to primary communication controller 510 and redundant communication controller 512 using connections 516 and powered element 504 may be connected to powered element 502 using connections 518 in a daisy-chain or loop configuration. Powered elements 502 and 504 each may include primary power controller 520, redundant power controller 522, primary local processor 524, redundant local processor 526, primary fibre channel (FC) switch 528, redundant FC switch 530, and numerous disk drive modules (DDMs) 532. Primary local processor 524, redundant local processor 526, primary fibre channel (FC) switch 528, and redundant FC switch 530 may be separate components or components within element control cards 534 and 536, respectively. Daisy-chaining the communication connections between primary communication controller 510 and primary FC switches 528, as well as between redundant communication controller 512 and redundant FC switches 530, may create a loop configuration, such as a FC loop, or the like.

During installation of powered elements 502 and 504, active energy management mechanism 538 within programming server/client 514 is programmed with a branch circuit rating and a circuit breaker rating for each powered element. Then during normal operation element controller cards 534 and 536 within powered elements 502 and 504 provide power consumption information to active energy management mechanism 538 via primary communication controller 510 and redundant communication controller 512. The power consumption information may include statistics, such as peak power consumption, lull power consumption, average power consumption, or the like. For each of powered elements 502 and 504, active energy management mechanism 538 determines a cumulative wattage rating using the power consumption information from the primary and redundant portions of the powered element. Using the cumulative wattage rating of the powered element and the branch circuit rating and the circuit breaker rating for the powered element, active energy management mechanism 538 determines a power reduction power cap to be used by the powered element in the event of a loss of either the primary power source or the redundant power source.

For example, if powered element 502 has a peak wattage rating of 2700 watts per power controller operating with a branch circuit rating of 120 volts, then powered element 502 would have an operation current that is calculated using Ohm's Law where Watts=Voltage*Amps, which in this case is 2700 watts/120 volts=22.5 amps. Since standard electrical circuit breaker sizes increase by 10 after the lowest 15 Amp (e.g. 20, 30, 40, etc.), then powered element 502 would be installed with a 30 amp circuit breaker for primary power controller 520 and redundant power controller 522. If during operation, powered element 502 provides a power consumption for primary power controller 520 of 2100 watts and a power consumption for redundant power controller 522 of 2220 to active energy management mechanism 538, then active energy management mechanism 538 would determine a cumulative wattage rating of 4320 watts. Using Ohm's law, active energy management mechanism 538 determines that the cumulative amperage is 4320 watts/120 volts=36 amps. However, the maximum that either primary power controller 520 or redundant power controller 522 may handle is 80 percent of the 30 amp circuit breaker value which is 24 amps. Therefore, active energy management mechanism 538 determines that in order for powered element 502 to operate using only primary power controller 520 or redundant power controller 522, then powered element must reduce power consumption to 24 amps/36 amps=66 percent. While this example is described in terms of a powered element operating with a supplied single phase 120 volt circuit, the illustrative embodiments are not limited to these operational parameters. That is, one of ordinary skill in the art would recognized that powered elements may operate using a single phase voltage such as 120 volts, 277 volts, or the like, or the powered elements may operated using three phase voltages such as 240 volts, 480 volts, or the like, and similar power reduction power caps may be calculated without departing from the spirit and scope of the invention.

Once active energy management mechanism 538 determines a power reduction power cap to be used by each powered element in the event of a loss of either the primary power source or the redundant power source, active energy management mechanism 538 sends the associated power reduction power cap to each of powered elements 502 and 504. Then, if during normal operation, one of powered elements 502 or 504 loses either the primary power source or the redundant power source, the operating power controller will reduce power by the reduction value in order that the powered element may maintain operation but at a reduced power level.

Also during installation of powered elements 502 and 504, active energy management mechanism 538 may be programmed with an identification of a paired powered elements that may serve as mutual backup to each other if the power supply of one of them fails or is reduced. In data centers where power failures may occur at a powered element level, rack level (group of powered elements), row level (group of racks), bay level (group of rows), or the like, each powered element may not be effected by a loss of power if another powered element loses power. By virtually connecting powered elements together through a network, when one powered element that is identified as a high priority powered element either has a reduction in power or loses primary power and is operating with a time constrained battery backup because of the loss of primary and redundant power sources, then a paired fully operational powered element that is network connected may be utilized to migrate information from the effected powered element to the fully operation powered element.

Figure 6:
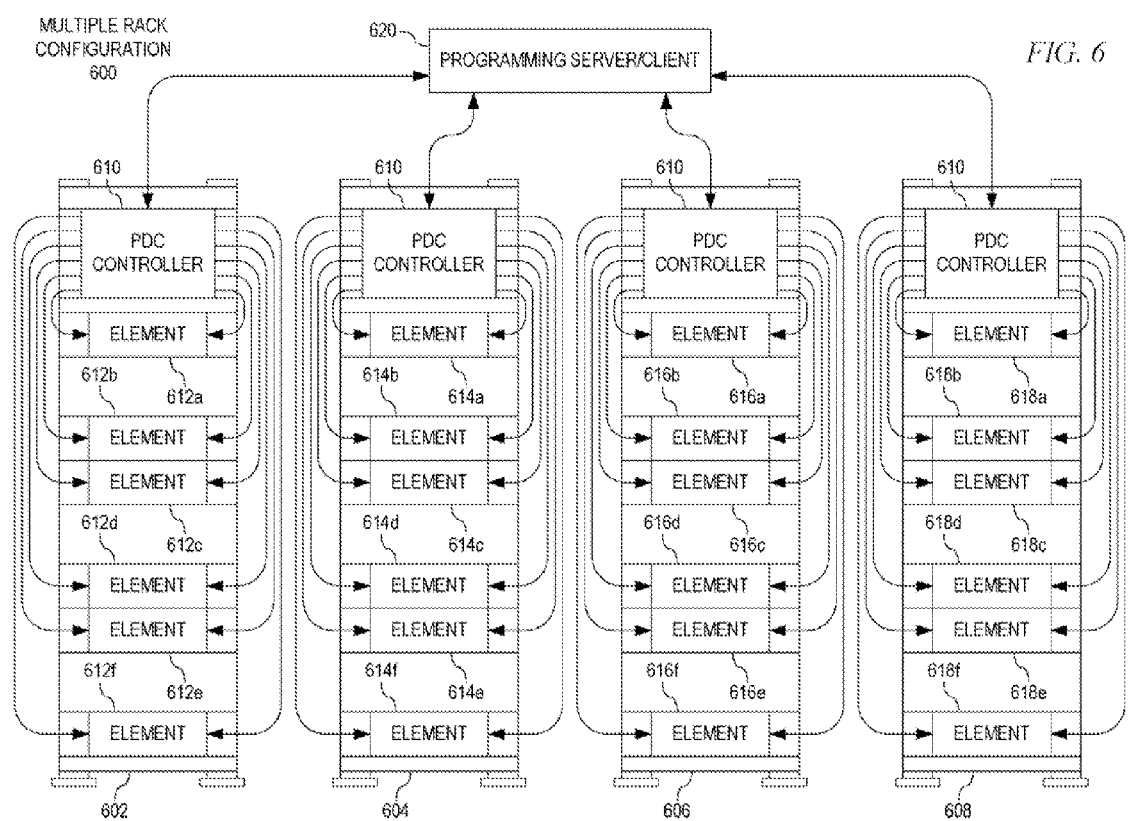
FIG. 6 depicts an example where powered elements serve as mutual backups to each other in accordance with an illustrative embodiment.

FIG. 6 depicts an example where powered elements serve as mutual backups to each other in accordance with an illustrative embodiment. In multiple rack configuration 600, each of racks 602-608 are configured with a power distribution and communication (PDC) controller 610. Each PDC controller 610 may comprise a primary power distribution device, a redundant power distribution device, primary communication controller, and redundant communication controller. Each of PDC controllers 610 controls a plurality of powered elements 612a-612f, 614a-614f, 616a-616f, and 618a-618f in racks 602-608, respectively. Additionally, PDC controllers 610 are coupled to programming server/client 620 either directly or through a network connection. That is, while rack 602 and 604 may be in one row within a data center, rack 606 may be in a separate row and rack 608 may be in a different room within the data center or in a completely geographically diverse location but still under control of programming server/client 620.

As described above, if, for example, rack 602 were to lose both primary and redundant power sources supplied through its respective PDC controller 610 and powered element 612d, which is operating on a time constrained battery backup, is identified to have a mutual backup of element 618b in rack 608, which has not lost power, then programming server/client 620, which is notified of power outages via the communications channels of the powered elements, may initiate a operations and/or data transfer from powered element 612d to powered element 618b. In order to execute such a transfer, powered element 612d would require direct connection to programming server/client 620 or the communications portion of PDC controller 610 would require battery backup as well.

As another example, if rack 604 were to lose its primary power source supplied through its respective PDC controller 610 and powered element 614e is identified to have a mutual backup of element 616c in rack 606, which has not lost power, then programming server/client 620 may initiate a operations and/or data transfer from powered element 614e to powered element 616c. In order to execute such a transfer, powered element 614e would first implement the reduced power level as described above and then transfer data to powered element 616c under the reduced power level condition.

In the event a powered element were to regain full power after operations and/or data has been moved to another powered element, then the active energy management mechanism of the illustrative embodiment may determine if a predefined policy exists to initiate a transfer of the operations and/or data back to the original powered element that has regained full power.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RP), etc.

Computer program code for carrying out operations of the present invention may be written in any combination of one or more programming languages, including an object oriented programming language such as Java™, C++ or the like and conventional procedural programming languages, such us the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In addition, the program code may be embodied on a computer readable storage medium on the server or the remote computer and downloaded over a network to a computer readable storage medium of the remote computer or the users' computer for storage and/or execution. Moreover, any of the computing systems or data processing systems may store the program code in a computer readable storage medium after having downloaded the program code over a network from a remote computing system or data processing system.

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 7:
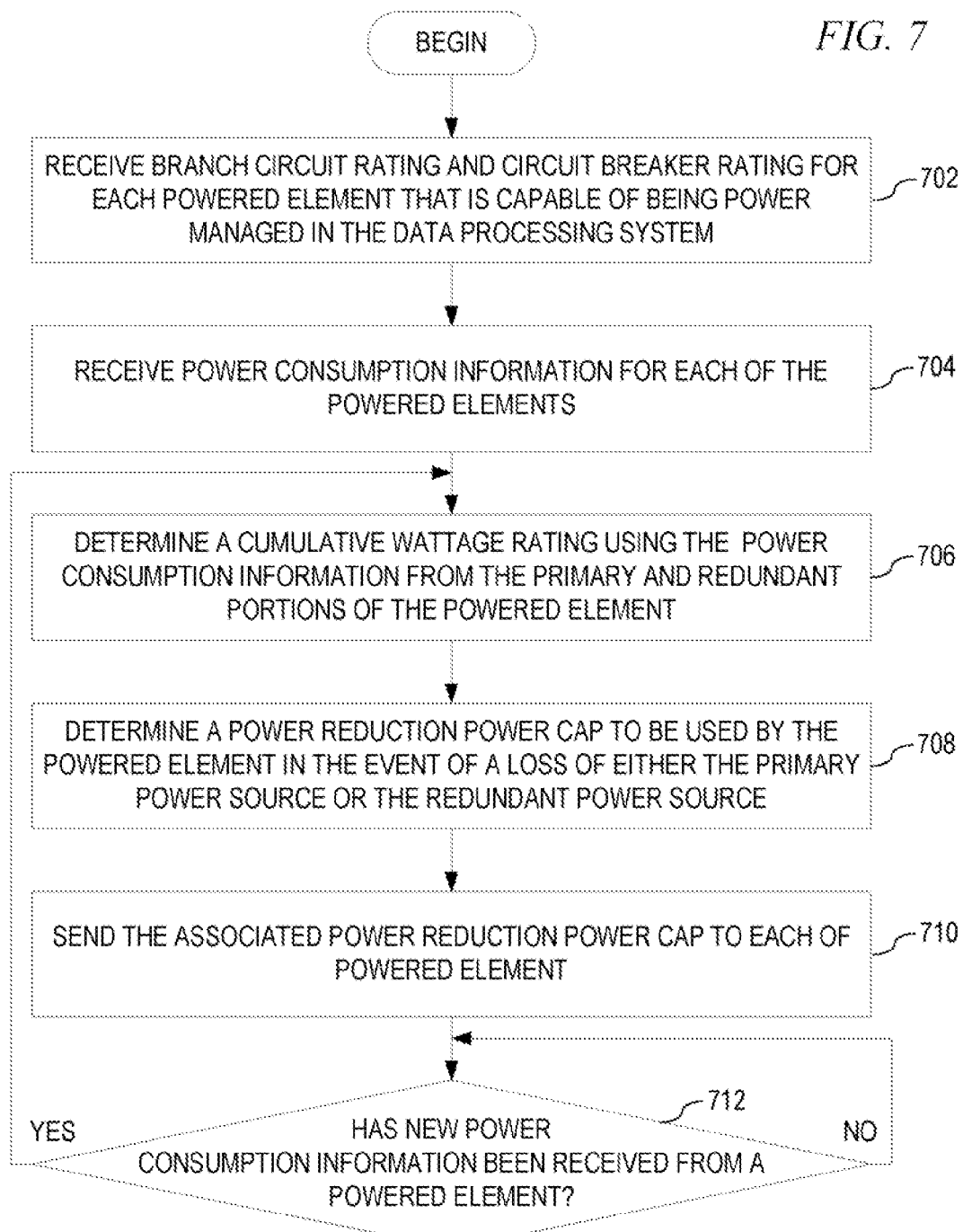
FIG. 7 depicts an exemplary flowchart of the operation performed by an active energy management mechanism in accordance with the illustrative embodiment.
Figure 8:
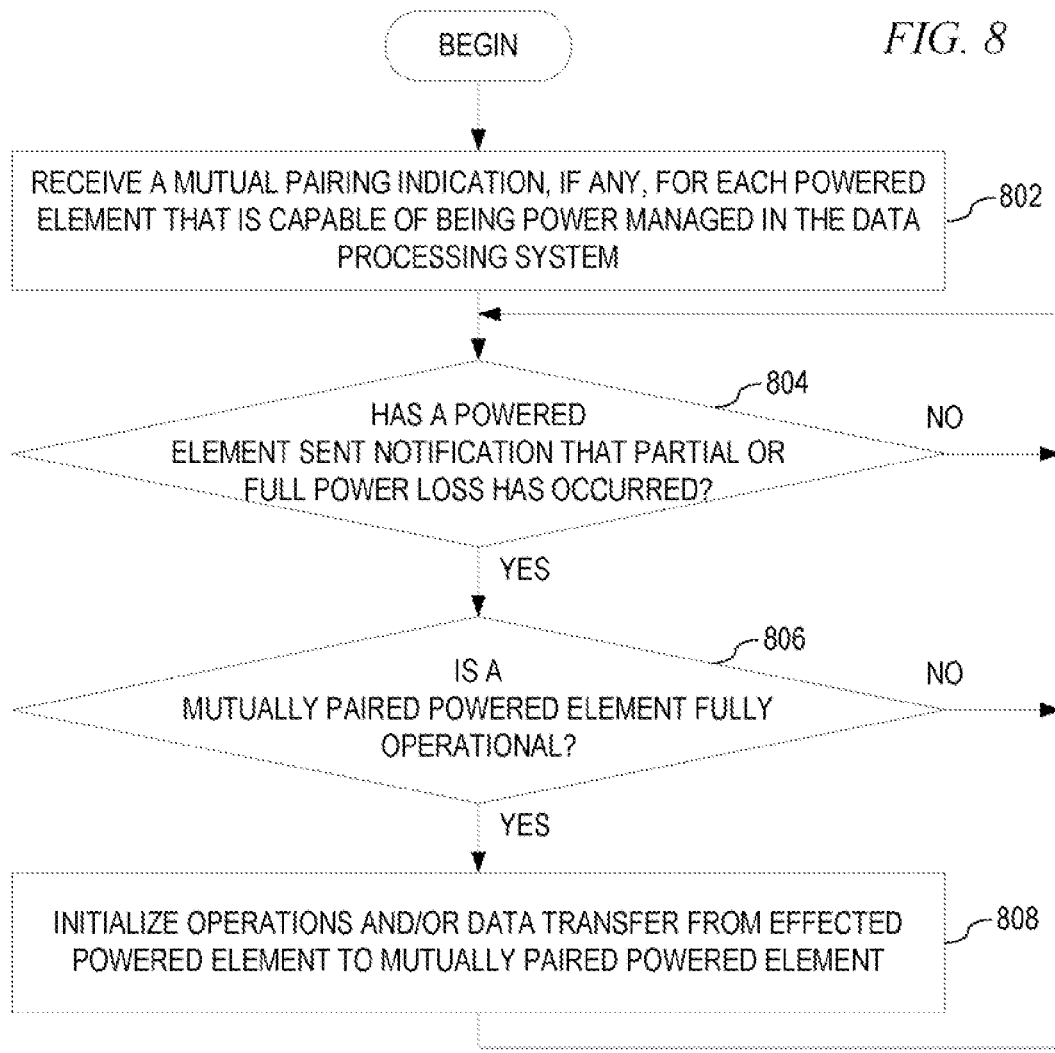
FIG. 8 depicts an exemplary flowchart of the operation performed by an programming server/client in accordance with the illustrative embodiment.
Figure 9:
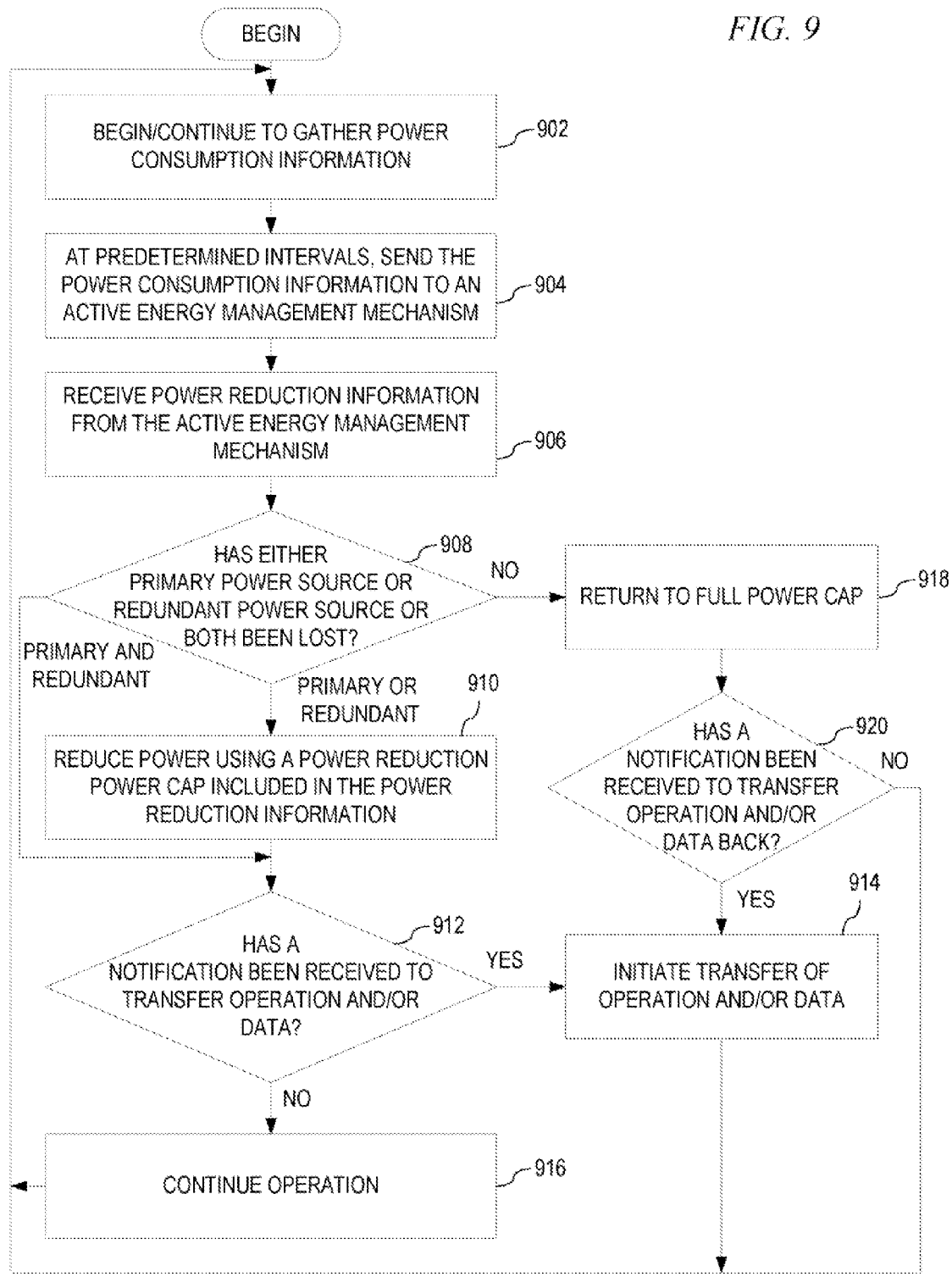
FIG. 9 depicts an exemplary flowchart of the operation performed by a powered element in accordance with the illustrative embodiment.

Referring now to FIGS. 7-9, these figures provide flowcharts outlining example operations of a data processing system in which an active energy management mechanism is implemented. FIG. 7 depicts an exemplary flowchart of the operation performed by an active energy management mechanism in accordance with the illustrative embodiment. As the operation begins, the active energy management mechanism receives a branch circuit rating and a circuit breaker rating for each powered element that is capable of being power managed in the data processing system (step 702). During normal operation, the active energy management mechanism receives power consumption information for each of the powered elements (step 704). The power consumption information may include statistics, such as peak power consumption, lull power consumption, average power consumption, or the like. For each of powered element, the active energy management mechanism determines a cumulative wattage rating using the power consumption information from the primary and redundant portions of the powered element (step 706). Using the cumulative wattage rating, the branch circuit rating, and the circuit breaker rating for the powered element, the active energy management mechanism determines a power reduction power cap to be used by the powered element in the event of a loss of either the primary power source or the redundant power source (step 708).

Once the active energy management mechanism determines a power reduction power cap to be used by each powered element in the event of a loss of either the primary power source or the redundant power source, the active energy management mechanism sends the associated power reduction power cap to each of powered element (step 710). The active energy management mechanism then determines if new power consumption information has been received from a powered element (step 712). If at step 712 the active energy management mechanism determines that no new power consumption information has been received for the powered element, then the operation returns to step 712. If at step 712 the active energy management mechanism determines that new power consumption information has been received for the powered element that provided the new power consumption information, then the operation returns to step 706.

FIG. 8 depicts an exemplary flowchart of the operation performed by an programming server/client in accordance with the illustrative embodiment. As the operation begins, the programming server/client receives a mutual pairing indication, if any, for each powered element that is capable of being power managed in the data processing system (step 802). Then the programming server/client determines if any notification has been received from an identified powered element that either its primary power source has been lost, the redundant power sources has been lost, or that the powered element is operating on a time constrained battery backup because both the primary power source and the redundant power source has been lost (step 804). If at step 804 the programming server/client has failed to receive any notification from an identified powered element, then the operation returns to step 804.

If at step 804 the programming server/client receives a notification from an identified powered element, the programming server/client then determines if a mutually paired powered element is fully operational (step 806). If at step 806 the mutually paired powered element is fully operational, then the programming server/client initializes operations and/or data transfer from effected powered element to the mutually paired powered element (step 808) with the operation returning to step 804 thereafter. If at step 806 the mutually paired powered element is not fully operational, then the programming server/client does not initialize the transfer and the operation returns to step 804 and continues to check whether the mutually paired powered element becomes fully operational or the effected powered element regains full power.

FIG. 9 depicts an exemplary flowchart of the operation performed by a powered element in accordance with the illustrative embodiment. As the operation begins, after initialization the powered element begins to gather power consumption information (step 902). At predetermined intervals, the powered element sends the power consumption information to an active energy management mechanism (step 904). The power consumption information may include statistics, such as peak power consumption, lull power consumption, average power consumption, or the like. In response to providing the power consumption information, the powered element receives power reduction information from the active energy management mechanism (step 906). Then the powered element determines if either the primary power source has been lost, the redundant power source has been lost, or if both the primary and the redundant power source have been lost (step 908). If at step 908 either the primary power source or the redundant power source has been lost, then the powered element reduces power using a power reduction power cap included in the power reduction information (step 910).

From step 910 or if at step 908 both the primary and the redundant power source have been lost and the powered element is operating on battery backup, then the powered element determines if a notification has been received to transfer operation and/or data to a mutually paired powered element (step 912). Even if the powered element identifies itself as a high priority powered element, the powered element will not transfer operation and/or data to the mutually paired powered element due to the fact that the powered element has no insight to the status of its paired powered element. If at step 912 the powered element receives notification to initiate transfer, then the powered element initiates transfer of operation and/or data (step 914) with the operation returning to step 902 to continue to gather power consumption information. If at step 912 the powered element fails to receive notification to initiate transfer, then the powered element operates on the time constrained battery backup for as long as possible (step 916) with the operation returning to step 902 to continue to gather power consumption information.

If at step 908 none of the power sources have been lost or the powered element regains full power, then the powered element returns to the full power cap at which the powered element previously operated (step 918). The powered element then determines if a notification has been received to transfer operation and/or data back from a mutually paired powered element based on a predefined policy (step 920). If at step 920 the powered element fails to receive notification to initiate transfer back, then the operation returns to step 902 to continue to gather power consumption information. If at step 920 the powered element receives notification to initiate transfer back, then the operation proceeds to step 914.

Thus, the illustrative embodiments provide mechanisms for an active energy management mechanism that may be implemented in a data processing system. The active energy management mechanism identifies branch circuit ratings and circuit breaker ratings for each powered element in a distributed data processing system. The active energy management mechanism then actively monitors each powered element to determine an average power consumption of the powered element. Based on the average power consumption, the branch circuit ratings, and the circuit breaker ratings for the powered element, the active energy management mechanism determines a power reduction power cap for the powered element if the powered element loses power. The powered element then uses the power reduction power cap to reduce power in the event the powered element loses either the primary or redundant power supply. Additionally, if a powered element loses either the primary or redundant power supply or completely loses power and is operating on a battery backup, then the active energy management mechanism provides for determining if the powered element has a paired powered element and, if so, initializes a information migration to the paired powered element if the paired powered element is fully operational.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for oversubscribing branch circuits, the method comprising:
   determining, by an active energy management mechanism in the data processing system, a cumulative wattage rating using power consumption information for a powered element, wherein the power consumption information is for to primary portion and a redundant portion of the powered element;
   determining, by the active energy management mechanism, a power reduction power cap to be used by the powered element in the event of a loss of either a primary power source or a redundant power source supplied to the powered element using the cumulative wattage rating, a branch circuit rating, and a circuit breaker rating for the powered element;
   sending, by the active energy management mechanism, the power reduction power cap to the powered element in order that the powered element reduces power to the power reduction power cap in the event of the loss of either the primary power source or the redundant power source supplied to the powered element;

receiving, by a programming server/client in the data processing system, an indication of a mutually paired powered element that is paired to the powered element;

responsive to a notification from the powered element that the powered element has lost either the primary power source, the redundant power source, or both the primary power source and the redundant power source and is operating on a time constrained battery backup, determining, by the programming server/client, whether the mutually paired powered element is fully operational; and responsive to the mutually paired powered element being fully operational, initializing, by the programming server/client, at least one of a operations or a data transfer from powered element to the mutually paired powered element.

2. The method of claim 1, further comprising:

determining, by the active energy management mechanism, whether new consumption information has been received from the powered element;

responsive to the new power consumption information being received, determining, by the active energy management mechanism, a new cumulative wattage rating using the new power consumption information for the powered element, wherein the new power consumption information is for the primary portion and the redundant portion of the powered element;

determining, by the active energy management mechanism, a new power reduction power cap using the new cumulative wattage rating, the branch circuit rating, and the circuit breaker rating for the powered element; and sending, by the active energy management mechanism, the new power reduction power cap to the powered element in order that the powered element reduces power to the new power reduction power cap in the event of the loss of either the primary power source or the redundant power source supplied to the powered element.

3. The method of claim 1, wherein the power consumption information comprises at least one of peak power consumption, lull power consumption, or average power consumption.

4. The method of claim 1, wherein the powered element is one of a set of powered elements and wherein the active energy management mechanism determines and sends an associated power reduction power cap to each powered element in the set of powered elements based on an associated cumulative wattage rating, an associated branch circuit rating, and an associated circuit breaker rating associated with each powered element.

5. The method of claim 1, further comprising;

responsive to the mutually paired powered element failing to be fully operational, continuously checking, by the programming server/client, to determine whether the mutually paired powered element becomes fully operational or the powered element regains full power.

6. The method of claim 1, wherein, in an event that the powered element regains full power, the powered element increases power to a full power cap of the powered element.

7. The method of claim 1, further comprising:

responsive to the powered element regaining full power, initializing, by the programming server/client, at least one of a operation or a data transfer from the mutually paired powered element to the powered element in response to a notification based on a predefined policy.

* * * * *